United States Patent
Liu et al.

(10) Patent No.: US 11,335,213 B2
(45) Date of Patent: May 17, 2022

(54) METHOD AND APPARATUS FOR ENCRYPTING DATA, METHOD AND APPARATUS FOR DECRYPTING DATA

(71) Applicant: BAIDU ONLINE NETWORK TECHNOLOGY (BEIJING) CO., LTD., Beijing (CN)

(72) Inventors: Yuepeng Liu, Beijing (CN); Peng Yun, Beijing (CN)

(73) Assignee: APOLLO INTELLIGENT DRIVING (BEIJING) TECHNOLOGY CO., LTD., Beijing (CN)

( * ) Notice: Subject to any disclaimer, the term of this patent is extended or adjusted under 35 U.S.C. 154(b) by 69 days.

(21) Appl. No.: 17/025,061

(22) Filed: Sep. 18, 2020

(65) Prior Publication Data

US 2021/0012682 A1    Jan. 14, 2021

Related U.S. Application Data

(62) Division of application No. 16/027,174, filed on Jul. 3, 2018, now Pat. No. 10,818,202.

(30) Foreign Application Priority Data

Jul. 4, 2017    (CN) .......................... 201710539291.5

(51) Int. Cl.
    *H04L 9/06*      (2006.01)
    *G09C 1/00*      (2006.01)
    *H04L 9/32*      (2006.01)

(52) U.S. Cl.
    CPC .............. *G09C 1/00* (2013.01); *H04L 9/0625* (2013.01); *H04L 9/0637* (2013.01); *H04L 9/0643* (2013.01); *H04L 9/3239* (2013.01)

(58) Field of Classification Search
    CPC ....... H04L 9/06; H04L 9/0625; H04L 9/0637; H04L 9/0643; H04L 9/3239;
(Continued)

(56) References Cited

U.S. PATENT DOCUMENTS

| | | | |
|---|---|---|---|
| 9,495,552 B2 | 11/2016 | El-shimi et al. | |
| 2009/0080647 A1* | 3/2009 | Mantin | H04L 9/0637 380/29 |

(Continued)

FOREIGN PATENT DOCUMENTS

| | | |
|---|---|---|
| CN | 101611631 A | 12/2009 |
| CN | 104023085 A | 9/2014 |

(Continued)

*Primary Examiner* — Jacob Lipman
(74) *Attorney, Agent, or Firm* — Lathrop GPM LLP (57) ABSTRACT

The disclosure discloses a method and apparatus for encrypting data, and a method and apparatus for decrypting data. The method for encrypting data includes: acquiring a to-be-encrypted data block; executing a first encryption on the to-be-encrypted data block to obtain a data ciphertext; executing a hash operation on the to-be-encrypted data block to obtain an index key; designating a last ciphertext block as a first target ciphertext block, and decrypting the first target ciphertext block to acquire an index value of the first target ciphertext block; executing a preset operation on the index value of the first target ciphertext block to obtain the index value of the to-be-encrypted data block, and executing a second encryption on the index value of the to-be-encrypted data block based on the index key to generate an index ciphertext; and combining the data ciphertext and the index ciphertext to generate a ciphertext block.

9 Claims, 5 Drawing Sheets

(58) Field of Classification Search
CPC .............. H04L 9/0631; H04L 63/0435; H04L 63/0442; G09C 1/00
USPC ......................................................... 380/28
See application file for complete search history.

(56) References Cited

U.S. PATENT DOCUMENTS

2012/0246485 A1* 9/2012 Norimoto ............... G06F 21/10
713/189
2017/0228371 A1* 8/2017 Seger, II ............. G06F 16/2379

FOREIGN PATENT DOCUMENTS

| CN | 105960645 A | 9/2016 |
| CN | 106790250 A | 5/2017 |

\* cited by examiner

METHOD AND APPARATUS FOR ENCRYPTING DATA, METHOD AND APPARATUS FOR DECRYPTING DATA

CROSS-REFERENCE TO RELATED APPLICATIONS

This application is a divisional application of U.S. patent application Ser. No. 16/027,174, filed on Jul. 3, 2018, which claims priority to Chinese Patent Application no. 201710539291.5, filed with the State Intellectual Property Office of the People's Republic of China (SIPO) on Jul. 4, 2017, the contents of which are incorporated herein by reference in their entireties.

TECHNICAL FIELD

The disclosure relates to the field of computer technology, specifically to the field of electronic data processing technology, and more specifically to a method and apparatus device for encrypting data, and a method and apparatus for decrypting data.

BACKGROUND

Data encryption means converting a plaintext into a ciphertext using an encryption algorithm and an encryption key, while data decryption means restoring the ciphertext to the plaintext using a decryption algorithm and a decryption key. Data encryption is a reliable method for protecting electronic data and ensuring data privacy.

According to existing data encryption schemes, data may be converted into a ciphertext using a key by a symmetric or asymmetric encryption method. When the key is stolen by a hostile cyber attacker, the hostile cyber attacker can falsify the encrypted data and encrypt the falsified data using the same key. However, the decrypting party is unable to determine the validity of the decrypted plaintext data. It is difficult to ensure the data reliability.

SUMMARY

In order to solve one or more of the technical problems mentioned in the background part, embodiments of the disclosure provide a method and apparatus for encrypting data, and a method and apparatus for decrypting data.

In a first aspect, an embodiment of the disclosure provides a method for encrypting data, including: acquiring a to-be-encrypted data block; executing a first encryption on the to-be-encrypted data block using a preset security key to obtain a data ciphertext of the to-be-encrypted data block; executing a hash operation on the to-be-encrypted data block to obtain an index key of the to-be-encrypted data block; designating a last ciphertext block in a generated ciphertext block sequence as a first target ciphertext block, and decrypting the first target ciphertext block to acquire an index value of the first target ciphertext block; executing a preset operation on the index value of the first target ciphertext block to obtain the index value of the to-be-encrypted data block, and executing a second encryption on the index value of the to-be-encrypted data block based on the index key to generate an index ciphertext of the to-be-encrypted data block; and combining the data ciphertext and the index ciphertext of the to-be-encrypted data block to generate a ciphertext block corresponding to the to-be-encrypted data block.

In some embodiments, the designating a last ciphertext block in a generated ciphertext block sequence as a first target ciphertext block, and decrypting the first target ciphertext block to acquire an index value of the first target ciphertext block includes: decrypting the first target ciphertext block using the preset security key, to obtain the index ciphertext and a data plaintext of the first target ciphertext block; executing the hash operation on the data plaintext of the first target ciphertext block to obtain the index key of the first target ciphertext block; and decrypting the index ciphertext of the first target ciphertext block using the index key of the first target ciphertext block, to obtain the index value of the first target ciphertext block.

In some embodiments, the executing a preset operation on the index value of the first target ciphertext block to obtain the index value of the to-be-encrypted data block includes: increasing the index value of the first target ciphertext block by one to obtain the index value of the to-be-encrypted data block.

In some embodiments, the method further includes: adding the ciphertext block corresponding to the to-be-encrypted data block to an end of the ciphertext block sequence.

In a second aspect, an embodiment of the disclosure provides a method for decrypting data, including: acquiring a to-be-decrypted ciphertext block; executing a first decryption on the to-be-decrypted ciphertext block using a preset security key to obtain a data plaintext and an index ciphertext of the to-be-decrypted ciphertext block; executing a hash operation on the data plaintext of the to-be-decrypted ciphertext block to obtain an index key of the to-be-decrypted ciphertext block; executing a second decryption on the index ciphertext of the to-be-decrypted ciphertext block using the index key of the to-be-decrypted ciphertext block to obtain an index value of the to-be-decrypted ciphertext block; designating a ciphertext block immediately prior to the to-be-decrypted ciphertext block in a ciphertext block sequence as a second target ciphertext block, and decrypting the second target ciphertext block to acquire the index value of the second target ciphertext block; and determining whether the index value of the to-be-decrypted ciphertext block and the index value of the second target ciphertext block meet a preset condition, to ascertain whether the data plaintext and the index value of the to-be-decrypted ciphertext block are valid data.

In some embodiments, the designating a ciphertext block immediately prior to the to-be-decrypted ciphertext block in a ciphertext block sequence as a second target ciphertext block, and decrypting the second target ciphertext block to acquire the index value of the second target ciphertext block includes: executing the first decryption on the second target ciphertext block using the preset security key to obtain the data plaintext and the index ciphertext of the second target ciphertext block; executing the hash operation on the data plaintext of the second target ciphertext block to obtain the index key of the second target ciphertext block; and executing the second decryption on the index ciphertext of the second target ciphertext block using the index key of the second target ciphertext block to obtain the index value of the second target ciphertext block.

In some embodiments, the determining whether the index value of the to-be-decrypted ciphertext block and the index value of the second target ciphertext block meet a preset condition, to ascertain whether the data plaintext and the index value of the to-be-decrypted ciphertext block are valid data includes: ascertaining, if the index value of the to-be-decrypted ciphertext block and the index value of the second target ciphertext block meet the preset condition, the data plaintext and the index value of the to-be-decrypted ciphertext block being valid data.

In a third aspect, an embodiment of the disclosure provides an apparatus for encrypting data, including: a first acquisition unit, configured for acquiring a to-be-encrypted data block; a first encryption unit, configured for executing a first encryption on the to-be-encrypted data block using a preset security key to obtain a data ciphertext of the to-be-encrypted data block; a first operation unit, configured for executing a hash operation on the to-be-encrypted data block to obtain an index key of the to-be-encrypted data block; a second acquisition unit, configured for designating a last ciphertext block in a generated ciphertext block sequence as a first target ciphertext block, and decrypting the first target ciphertext block to acquire an index value of the first target ciphertext block; a second encryption unit, configured for executing a preset operation on the index value of the first target ciphertext block to obtain the index value of the to-be-encrypted data block, and executing a second encryption on the index value of the to-be-encrypted data block based on the index key to generate an index ciphertext of the to-be-encrypted data block; and a generation unit, configured for combining the data ciphertext and the index ciphertext of the to-be-encrypted data block to generate a ciphertext block corresponding to the to-be-encrypted data block.

In some embodiments, the second acquisition unit is further configured for: decrypting the first target ciphertext block using the preset security key, to obtain the index ciphertext and a data plaintext of the first target ciphertext block; executing the hash operation on the data plaintext of the first target ciphertext block to obtain the index key of the first target ciphertext block; and decrypting the index ciphertext of the first target ciphertext block using the index key of the first target ciphertext block, to obtain the index value of the first target ciphertext block.

In some embodiments, the second encryption unit is further configured for: increasing the index value of the first target ciphertext block by one to obtain the index value of the to-be-encrypted data block.

In some embodiments, the apparatus further includes: an addition unit, configured for adding the ciphertext block corresponding to the to-be-encrypted data block to an end of the ciphertext block sequence.

In a fourth aspect, an embodiment of the disclosure provides an apparatus for decrypting data, including: a third acquisition unit, configured for acquiring a to-be-decrypted ciphertext block; a first decryption unit, configured for executing a first decryption on the to-be-decrypted ciphertext block using a preset security key to obtain a data plaintext and an index ciphertext of the to-be-decrypted ciphertext block; a second operation unit, configured for executing a hash operation on the data plaintext of the to-be-decrypted ciphertext block to obtain an index key of the to-be-decrypted ciphertext block; a second decryption unit, configured for executing a second decryption on the index ciphertext of the to-be-decrypted ciphertext block using the index key of the to-be-decrypted ciphertext block to obtain an index value of the to-be-decrypted ciphertext block; a fourth acquisition unit, configured for designating a ciphertext block immediately prior to the to-be-decrypted ciphertext block in a ciphertext block sequence as a second target ciphertext block, and decrypting the second target ciphertext block to acquire the index value of the second target ciphertext block; and an ascertaining unit, configured for determining whether the index value of the to-be-decrypted ciphertext block and the index value of the second target ciphertext block meet a preset condition, to ascertain whether the data plaintext and the index value of the to-be-decrypted ciphertext block are valid data.

In some embodiments, the fourth acquisition unit is further configured for: executing the first decryption on the second target ciphertext block using the preset security key to obtain the data plaintext and the index ciphertext of the second target ciphertext block; executing the hash operation on the data plaintext of the second target ciphertext block to obtain the index key of the second target ciphertext block; and executing the second decryption on the index ciphertext of the second target ciphertext block using the index key of the second target ciphertext block to obtain the index value of the second target ciphertext block.

In some embodiments, the ascertaining unit is further configured for: ascertaining, if the index value of the to-be-decrypted ciphertext block and the index value of the second target ciphertext block meet the preset condition, the data plaintext and the index value of the to-be-decrypted ciphertext block being valid data.

In a fifth aspect, an embodiment of the disclosure provides a device for encrypting data, including: a memory, for storing one or more programs, and one or more processors; where the one or more programs enable, when executed by the one or more processors, the one or more processors to implement the method for encrypting data.

In a sixth aspect, an embodiment of the disclosure provides a device for decrypting data, including: a memory, for storing one or more programs, and one or more processors; where the one or more programs enable, when executed by the one or more processors, the one or more processors to implement the method for decrypting data.

A method and apparatus for encrypting data provided by the disclosure acquire a to-be-encrypted data block; then execute a first encryption on the to-be-encrypted data block using a preset security key to obtain a data ciphertext of the to-be-encrypted data block; then execute a hash operation on the to-be-encrypted data block to obtain an index key of the to-be-encrypted data block; then designate a last ciphertext block in a generated ciphertext block sequence as a first target ciphertext block, and decrypt the first target ciphertext block to acquire an index value of the first target ciphertext block; then execute a preset operation on the index value of the first target ciphertext block to obtain the index value of the to-be-encrypted data block, and execute a second encryption on the index value of the to-be-encrypted data block based on the index key to generate an index ciphertext of the to-be-encrypted data block; and finally combine the data ciphertext and the index ciphertext of the to-be-encrypted data block to generate a ciphertext block corresponding to the to-be-encrypted data block, thereby achieving encryption of the index of the to-be-encrypted data block, and improving the index security. Furthermore, there is a correlation between indexes of adjacent data blocks, ascertainable data validity has been achieved, and data falsification can be effectively prevented.

A method and apparatus for decrypting data provided by the disclosure acquire a to-be-decrypted ciphertext block; then execute a first decryption on the to-be-decrypted ciphertext block using a preset security key to obtain a data plaintext and an index ciphertext of the to-be-decrypted ciphertext block; then execute a hash operation on the data plaintext of the to-be-decrypted ciphertext block to obtain an index key of the to-be-decrypted ciphertext block; then execute a second decryption on the index ciphertext of the to-be-decrypted ciphertext block using the index key of the to-be-decrypted ciphertext block to obtain an index value of the to-be-decrypted ciphertext block; then designate a ciphertext block immediately prior to the to-be-decrypted ciphertext block in a ciphertext block sequence as a second target ciphertext block, and decrypt the second target ciphertext block to acquire the index value of the second target ciphertext block; and finally determine whether the index value of the to-be-decrypted ciphertext block and the index value of the second target ciphertext block meet a preset condition, to ascertain whether the data plaintext and the index value of the to-be-decrypted ciphertext block are valid data, thereby improving the security of the index of data blocks, enabling to ascertain whether decrypted data are valid using a correlation between indexes, and effectively preventing data falsification.

BRIEF DESCRIPTION OF THE DRAWINGS

By reading and referring to detailed description on the non-limiting embodiments in the following accompanying drawings, other features, objects and advantages of the disclosure will become more apparent.

DETAILED DESCRIPTION OF EMBODIMENTS

The present application will be further described below in detail in combination with the accompanying drawings and the embodiments. It should be appreciated that the specific embodiments described herein are merely used for explaining the relevant disclosure, rather than limiting the disclosure. In addition, it should be noted that, for the ease of description, only the parts related to the relevant disclosure are shown in the accompanying drawings.

It should also be noted that the embodiments in the present application and the features in the embodiments may be combined with each other on a non-conflict basis. The present application will be described below in detail with reference to the accompanying drawings and in combination with the embodiments.

Figure 1:
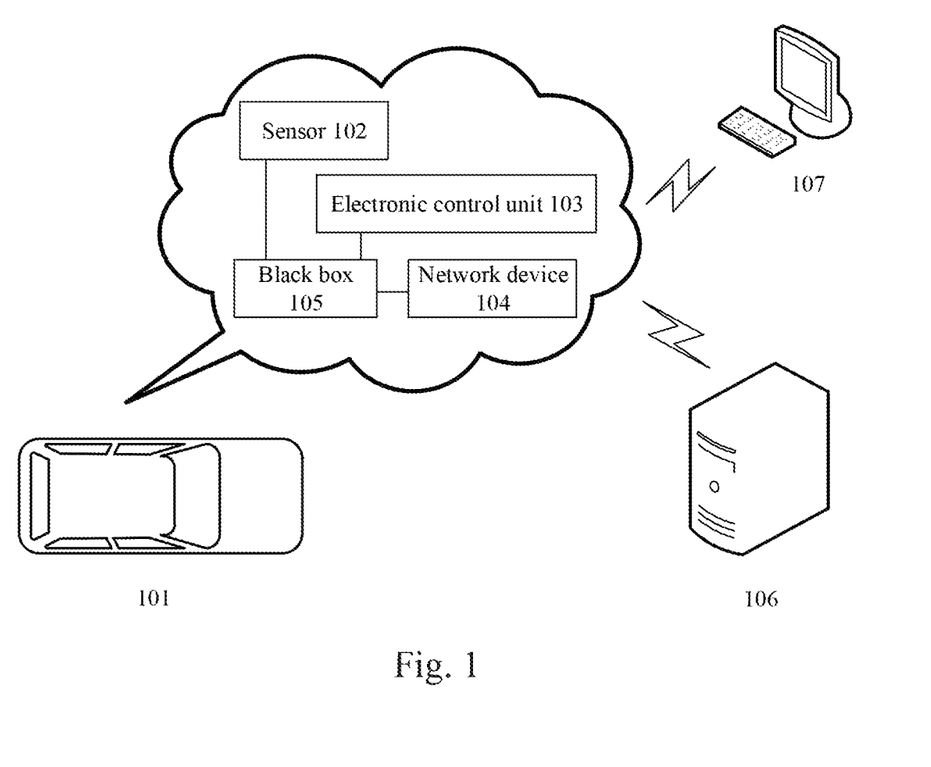
FIG. 1 is a structural diagram of an illustrative system in which the disclosure may be applied.

FIG. 1 shows an illustrative architecture of a system in which the present disclosure may be applied.

As shown in FIG. 1, the disclosure may be applied to encrypting and decrypting vehicular data of a vehicle. A system architecture 100 of the illustrative application scenario may include a vehicle 101, a server 106, and a terminal device 107. The vehicle 101 may be an autonomous driving vehicle, including a plurality of sensors 102, an electronic control unit 103, a network device 104, and a black box 105. The sensors 102 may be various vehicle sensors, such as a collision sensor, a brake sensor, an airbag sensor, a speed sensor, and an engine inlet pressure sensor. The electronic control unit 103, such as the ECU (Electronic Control Unit), may be the "brain" of the vehicle, and may be used for making a decision on control based on acquired road condition information and running state information, and sending instructions to control parts. The network device 104 may be used to connect the vehicle 101 to an external device, where the connection type is not limited to wired connection or wireless connection. The black box 105 is used for storing vehicular data. The black box 105 may be connected to the sensor 102 and the electronic control unit 103. The data acquired by the sensor 102 and the instructions sent by the electronic control unit 103 are recorded in the black box 105. The data may be encrypted before writing in the black box.

The server 106 may be a server providing services for the vehicle 101, e.g., may be a server for storing and analyzing data in the black box 105. The server 106 may read the data stored in the black box 105. The server 106 may decrypt encrypted data in the black box 105 when reading the data. Then, the server 106 may analyze the driving behavior and control based on decrypted data.

The terminal device 107 may be a terminal having a user interactive interface. The terminal device 107 can establish a connection to the black box 105, and read data from the black box 105 in response to a request from a data analyst. When reading the data, it is necessary to decrypt the encrypted data in the black box 105, to obtain plaintext data and provide the plaintext data to the data analyst.

It should be noted that the method for encrypting data provided by an embodiment of the disclosure may be executed by the black box 105, the server 106, or the terminal device 107. Accordingly, the apparatus for encrypting data may be set in the black box 105, the server 106, or the terminal device 107. The method for decrypting data provided by an embodiment of the disclosure may be executed by the server 106 or the terminal device 107. Accordingly, the apparatus for decrypting data may be set in the server 106 or the terminal device 107.

It should be appreciated that the numbers of servers, vehicles, sensors, network devices, black boxes, and terminal devices in FIG. 1 are only illustrative. There may be any number of cloud servers, vehicles, sensors, network devices, black boxes, and terminal devices based on implementation needs.

Furthermore, the method for encrypting data, the apparatus for encrypting data, the method for decrypting data and the apparatus for decrypting data provided by embodiments of the disclosure may also be applied to other electronic device having a processing capability in a scenario requiring protection of data security, which is not particularly limited in the disclosure.

Figure 2:
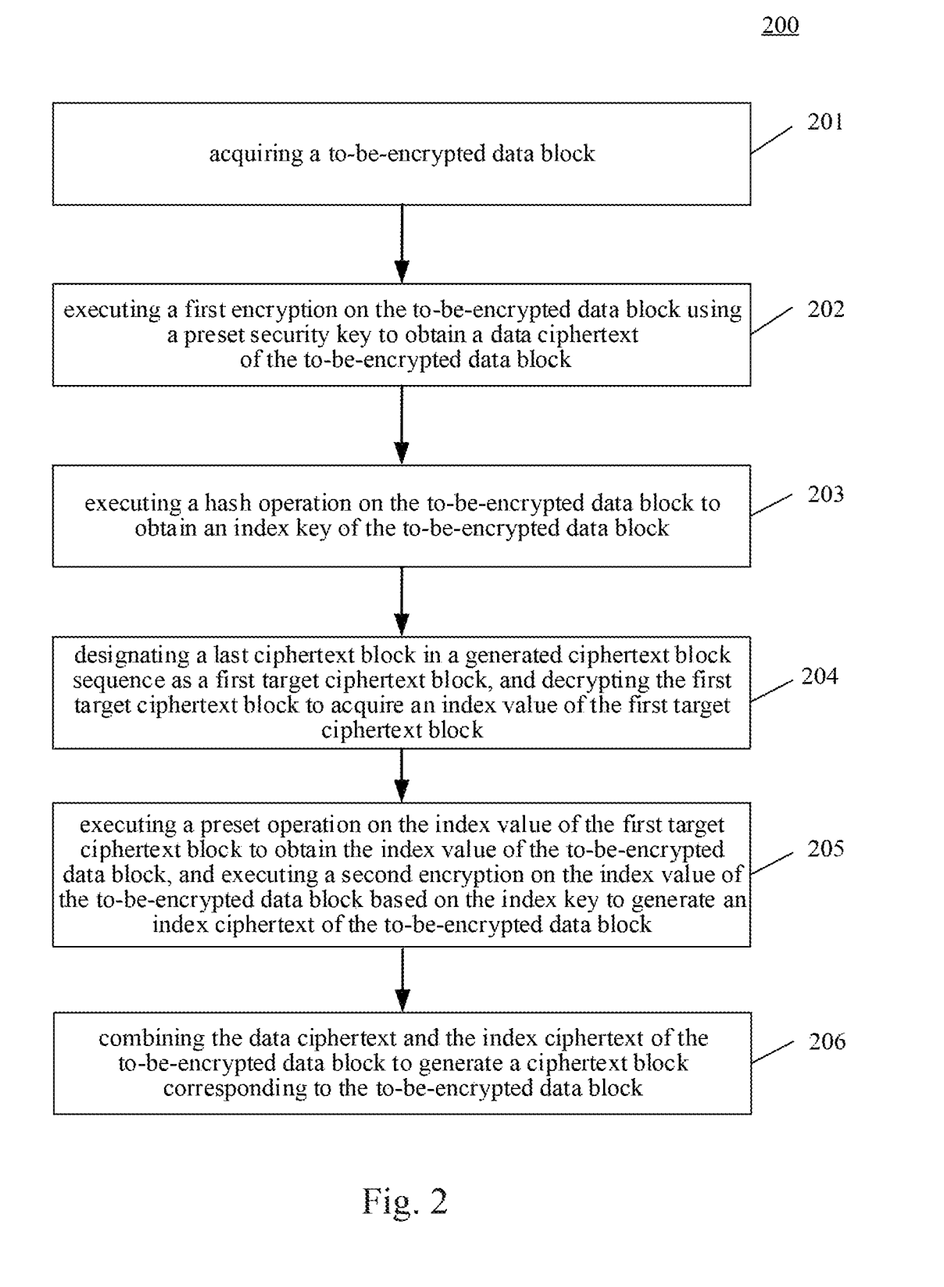
FIG. 2 is a process diagram of an embodiment of a method for encrypting data according to the disclosure.

Further referring to FIG. 2, a process 200 of an embodiment of a method for encrypting data according to the disclosure is shown. The method for encrypting data includes:

Step 201: acquiring a to-be-encrypted data block.

In this embodiment, the to-be-encrypted data can be transmitted to an electronic device on which the method for encrypting data is applied in the form of a data block. Here, the data block may be formed by dividing the to-be-encrypted data. The electronic device on which the method for encrypting data runs can receive the to-be-encrypted data block via a network, or receive the to-be-encrypted data block through a data input interface.

In the system architecture as shown in FIG. 1, the black box may be connected to sensors and control units via a bus, e.g., a controller area network (CAN) bus, and then may receive via the bus a data packet including sensor data collected by the sensors and instruction data sent by the control units. The data packet may be divided based on the generation time or data type thereof to form a plurality of to-be-encrypted data blocks.

In some optional implementations, the to-be-encrypted data block may include a plurality of data blocks obtained by dividing the to-be-encrypted data based on the data source, data collection or generation time. For example, when the speed sensor and the electronic control unit (ECU) transmit data simultaneously, received data can be divided into two blocks respectively being a speed sensor data block and an ECU control instruction data block, so that vehicular data may be classified, and encrypted in different blocks in subsequent process, thereby improving data storage and read efficiency.

Step 202: executing a first encryption on the to-be-encrypted data block using a preset security key to obtain a data ciphertext of the to-be-encrypted data block.

In the embodiment, the first encryption may be executed on the to-be-encrypted data block using a symmetric encryption method. Specifically, a preset security key may be acquired. The security key may be used for encrypting the to-be-encrypted data, and may also be used for decrypting the encrypted data. Then an encryption algorithm may be selected for encryption with the acquired security key as a parameter. Here, the encryption algorithm may, for example, be a Data Encryption Standard (DES), an Advanced Encryption Standard (AES), or other symmetric encryption algorithm. Furthermore, the security key with different byte lengths may also be selected for encryption based on the needs of encryption speed and encryption complexity. For example, when a 128-bit security key may be selected, and the first encryption is executed on the to-be-encrypted data block using an AES128 encryption algorithm.

After the first encryption is executed on the to-be-encrypted data block, the plaintext to-be-encrypted data block is converted into a ciphertext, i.e., a data ciphertext of the to-be-encrypted data block is obtained.

Step 203: executing a hash operation on the to-be-encrypted data block to obtain an index key of the to-be-encrypted data block.

In the embodiment, the hash operation may be executed on the to-be-encrypted data block to obtain a hash value, which can be used as the index key of the to-be-encrypted data block. Here, the employed hash operation may be, for example, a Secure Hash Algorithm (SHA), a Message Digest Algorithm MD5 (MD5) or the like.

In the embodiment, an index may be established for each to-be-encrypted data block, and the index key may be a key for encrypting the index. Thus, by encrypting the index, the index cannot be easily acquired, thereby improving the index security.

Furthermore, in the embodiment, the index key may be generated based on the hash operation result of the to-be-encrypted data block, i.e., the index key is associated with the to-be-encrypted data block. When the content of the data block is different, the index key is also different. Alternatively, the to-be-encrypted data block may contain a unique identifier for distinguishing with other data blocks, so that the hash values obtained by executing the hash operation on different to-be-encrypted data blocks are different, thereby ensuring that different to-be-encrypted data blocks have different index keys.

Step 204: designating a last ciphertext block in a generated ciphertext block sequence as a first target ciphertext block, and decrypting the first target ciphertext block to acquire an index value of the first target ciphertext block.

In the embodiment, a currently generated ciphertext block sequence may be acquired, where the last ciphertext block thereof is the ciphertext block immediately prior to the to-be-encrypted data block. The last ciphertext block in the generated ciphertext block sequence may be used as the first target ciphertext block, and the first target ciphertext block may be decrypted to acquire the index value of the first target ciphertext block.

Each ciphertext block in the generated ciphertext block sequence may include a data ciphertext and an index, and the each ciphertext block may be generated by the encryption using a symmetric encryption algorithm. Here, the index of the first target ciphertext block may be a plaintext index. The encryption algorithm and the key for encrypting the first target ciphertext block may be acquired, and the index of the first target ciphertext block may be obtained by decrypting the first target ciphertext block using the acquired key and corresponding decryption algorithm.

In some optional implementations of the embodiment, the index of the ciphertext block in the ciphertext block sequence is an index ciphertext, and the ciphertext blocks are encrypted using a security key identical to the security key for encrypting the to-be-encrypted data block. Then, the designating a last ciphertext block in a generated ciphertext block sequence as a first target ciphertext block, and decrypting the first target ciphertext block to acquire an index value of the first target ciphertext block includes: decrypting the first target ciphertext block using the preset security key, to obtain the index ciphertext and a data plaintext of the first target ciphertext block; executing the hash operation on the data plaintext of the first target ciphertext block to obtain the index key of the first target ciphertext block; and decrypting the index ciphertext of the first target ciphertext block using the index key of the first target ciphertext block, to obtain the index value of the first target ciphertext block.

That is, the electronic device may encrypt the to-be-encrypted data blocks using an identical method and process, and use the identical preset security key for each to-be-encrypted data block. Thus, the first target ciphertext block may be decrypted using the acquired preset security key to obtain the index ciphertext and the data plaintext of the first target ciphertext block. Because the index key of the first target ciphertext block is obtained by executing the hash operation on the data plaintext, the index key of the first target ciphertext block may be obtained by executing the hash operation on the decrypted data plaintext. Then, the index ciphertext of the first target ciphertext block may be decrypted using the index key, to obtain the index value of the first target ciphertext block.

Optionally, the index values of the data blocks (including ciphertext blocks and to-be-encrypted data blocks) in the embodiment may be either natural numbers or set character strings.

Step 205: executing a preset operation on the index value of the first target ciphertext block to obtain the index value of the to-be-encrypted data block, and executing a second encryption on the index value of the to-be-encrypted data block based on the index key to generate an index ciphertext of the to-be-encrypted data block.

After obtaining the index value of the first target ciphertext block, i.e., the index value of the ciphertext block immediately prior to the to-be-encrypted data block, the index value of the to-be-encrypted data block may be obtained by executing a preset operation on the index value of the first target ciphertext block. Here, the preset operation may be a preset additive operation, a multiplication, or an operation executed based on a preset formula. When the index value of the first target ciphertext block is a character string, the preset operation may be increasing a preset character behind the character string.

In some optional implementations of the embodiment, the executing a preset operation on the index value of the first target ciphertext block to obtain the index value of the to-be-encrypted data block may include: increasing the index value of the first target ciphertext block by one to obtain the index value of the to-be-encrypted data block. The index values of the ciphertext blocks in the ciphertext block sequence are successively 1, 2, 3 . . . .

Furthermore, if the to-be-encrypted data block is the first data block, then the first target ciphertext block in the generated ciphertext block sequence is blank, and the index value of the first target ciphertext block may be set as zero.

After obtaining the index value of the to-be-encrypted data block by the operation, the index ciphertext of the to-be-encrypted data block may be generated by executing the second encryption on the index value of the to-be-encrypted data block using a preset encryption algorithm based on the index key obtained in the step 203. Here, a given encryption algorithm may be used for the second encryption and the first encryption.

Step 206: combining the data ciphertext and the index ciphertext of the to-be-encrypted data block to generate a ciphertext block corresponding to the to-be-encrypted data block.

In the embodiment, the data ciphertext of the to-be-encrypted data block obtained in the step 202 and the index ciphertext of the to-be-encrypted data block obtained in the step 205 may be combined, e.g., spliced, to generate the ciphertext block corresponding to the to-be-encrypted data block. During splicing, a preset separating character may be added to separate the data ciphertext and the index ciphertext, or an identifier character for identifying the corresponding field as the data ciphertext may be added to the data ciphertext, and an identifier character for identifying the corresponding field as the index ciphertext may be added to the index ciphertext, to facilitate quickly distinguishing between the index ciphertext and the data ciphertext.

In some optional implementations of the embodiment, the ciphertext block corresponding to the to-be-encrypted data block generated in the step 206 may also be added to the end of the generated ciphertext block sequence. Thus, when encrypting the next to-be-encrypted data block, the ciphertext block generated in the step 206 may be used as the first target ciphertext block of the next to-be-encrypted data block.

A method for encrypting data according to the embodiment of the disclosure acquires a to-be-encrypted data block; then executes a first encryption on the to-be-encrypted data block using a preset security key to obtain a data ciphertext of the to-be-encrypted data block; then executes a hash operation on the to-be-encrypted data block to obtain an index key of the to-be-encrypted data block; then designates a last ciphertext block in a generated ciphertext block sequence as a first target ciphertext block, and decrypts the first target ciphertext block to acquire an index value of the first target ciphertext block; then executes a preset operation on the index value of the first target ciphertext block to obtain the index value of the to-be-encrypted data block, and executes a second encryption on the index value of the to-be-encrypted data block based on the index key to generate an index ciphertext of the to-be-encrypted data block; and finally combines the data ciphertext and the index ciphertext of the to-be-encrypted data block to generate a ciphertext block corresponding to the to-be-encrypted data block, thereby achieving encryption of the index of the to-be-encrypted data block, and improving the index security. Furthermore, there is a correlation between indexes of adjacent data blocks, ascertainable data validity has been achieved, and data falsification can be effectively prevented.

Figure 3:
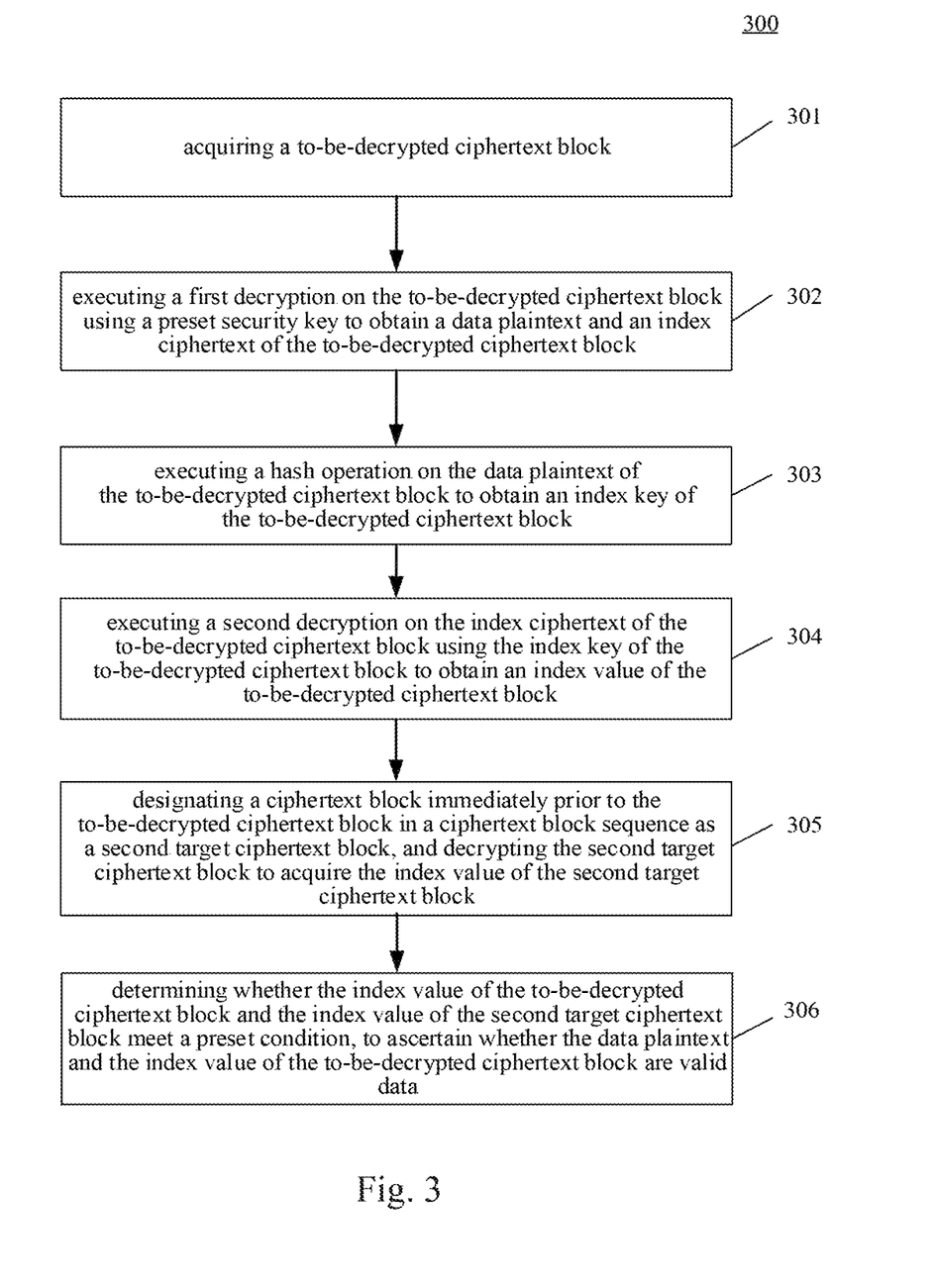
FIG. 3 is a process diagram of an embodiment of a method for decrypting data according to the disclosure.

Further referring to FIG. 3, a process 300 of an embodiment of a method for decrypting data according to the disclosure is shown. The method for decrypting data includes:

Step 301: acquiring a to-be-decrypted ciphertext block.

In the embodiment, the electronic device on which the method for decrypting data runs may acquire a to-be-decrypted ciphertext block. Here, the to-be-decrypted ciphertext block may include a data ciphertext and an index ciphertext. The data ciphertext is an encrypted text of plaintext data content corresponding to the ciphertext block, and the index ciphertext is an encrypted text of the index for querying the ciphertext block or the plaintext data corresponding to the ciphertext block.

The electronic device may receive a transmitted to-be-decrypted ciphertext block via a wired or wireless connection, in response to a data transmission request from other device. For example, in the system architecture as shown in FIG. 1, the terminal device 107 or the server 106 may receive encrypted vehicular data stored in the black box 105 from the black box 105, and the vehicular data are generated and transmitted in the form of a data block.

Step 302: executing a first decryption on the to-be-decrypted ciphertext block using a preset security key to obtain a data plaintext and an index ciphertext of the to-be-decrypted ciphertext block.

In the embodiment, the to-be-decrypted ciphertext block may be generated by the encryption using a symmetric or asymmetric encryption algorithm. The electronic device may pre-acquire a security key for decrypting the ciphertext block, and decrypt the to-be-decrypted ciphertext block using an algorithm, such as DES or AES, to obtain the data plaintext and the index ciphertext in the to-be-decrypted ciphertext block.

In the embodiment, the first decryption may further include: identifying the data ciphertext and the index ciphertext in the to-be-decrypted data block, and decrypting the identified data ciphertext using the acquired security key to obtain the data plaintext. Specifically, the to-be-decrypted data block may be generated from the data ciphertext and the index ciphertext, where the data ciphertext is generated by executing the first encryption on the data block using the security key, and the decryption algorithm used in the first decryption may be reciprocal to the encryption algorithm used in the first encryption. A given security key is used in the first decryption and the first encryption, the data ciphertext may be converted into the data plaintext using the decryption algorithm, and the identified index ciphertext is temporarily not processed.

Step 303: executing a hash operation on the data plaintext of the to-be-decrypted ciphertext block to obtain an index key of the to-be-decrypted ciphertext block.

In the embodiment, the index key corresponding to the index ciphertext obtained by executing the first decryption in the step 302 may be acquired as follows: executing a hash operation on the data plaintext of the to-be-decrypted ciphertext block, and the hash value obtained is the index key. When encrypting the data plaintext corresponding to the ciphertext block, the index value may be generated by executing the hash operation on the data plaintext, then accordingly, during the decryption, the index key may be obtained by executing the hash operation on the data plaintext obtained in the step 302. Alternatively, an algorithm, e.g., SHA or MD5, may be used in the hash operation.

Here, the index key obtained by executing the hash operation on the data plaintext obtained in the step 302 may be a character or a character string, where the character string may be a numeral.

Step 304: executing a second decryption on the index ciphertext of the to-be-decrypted ciphertext block using the index key of the to-be-decrypted ciphertext block to obtain an index value of the to-be-decrypted ciphertext block.

In the embodiment, the second decryption may be executed on the index ciphertext obtained in the step 302 using the index key obtained in the step 303. Specifically, the index ciphertext may be converted into a plaintext using a preset decryption algorithm with the index key as a parameter of the decryption algorithm, and then the index value of the to-be-decrypted ciphertext block can be obtained.

Step 305: designating a ciphertext block immediately prior to the to-be-decrypted ciphertext block in a ciphertext block sequence as a second target ciphertext block, and decrypting the second target ciphertext block to acquire the index value of the second target ciphertext block.

The to-be-decrypted ciphertext block may be a ciphertext block in the ciphertext block sequence, the ciphertext block sequence may be stored in the electronic device on which the method for decrypting data runs, and ciphertext blocks in the ciphertext block sequence are arranged in order. Specifically, the ciphertext blocks in the ciphertext block sequence may be arranged in the order of their index values.

In the embodiment, the ciphertext block immediately prior to the to-be-decrypted ciphertext block in the ciphertext block sequence may be used as the second target ciphertext block, and then the second target ciphertext block may be decrypted to obtain the index value of the second target ciphertext block. Here, the ciphertext blocks in the ciphertext block sequence may be generated by the encryption using a symmetric encryption algorithm, and the ciphertext blocks are encrypted using a shared key, i.e., the security keys of the ciphertext blocks are identical.

In some optional implementations of the embodiment, the index of the second target ciphertext block may be a plaintext index, then the second target ciphertext block may be decrypted using the shared key to convert the second target ciphertext block into a plaintext, and then the plaintext index therein may be extracted as the index value of the second target ciphertext block.

In some other optional implementations of the embodiment, the index of the ciphertext block in the ciphertext block sequence is an index ciphertext, and the designating a ciphertext block immediately prior to the to-be-decrypted ciphertext block in the ciphertext block sequence as a second target ciphertext block, and decrypting the second target ciphertext block to acquire the index value of the second target ciphertext block may include: executing the first decryption on the second target ciphertext block using the preset security key to obtain the data plaintext and the index ciphertext of the second target ciphertext block; executing the hash operation on the data plaintext of the second target ciphertext block to obtain the index key of the second target ciphertext block; and executing the second decryption on the index ciphertext of the second target ciphertext block using the index key of the second target ciphertext block to obtain the index value of the second target ciphertext block.

Specifically, the second target ciphertext block may be encrypted using the method for encrypting data as shown in FIG. 2. When the second target ciphertext block is decrypted, the second target ciphertext block may be decrypted using the acquired preset security key to obtain an index ciphertext and a data plaintext of the second target ciphertext block. Because the index key of the second target ciphertext block is obtained by executing the hash operation on the data plaintext, the index key of the second target ciphertext block may be obtained by executing the hash operation on the decrypted data plaintext; and then the index ciphertext of the second target ciphertext block may be decrypted using the index key, to obtain the index value of the second target ciphertext block.

Step 306: determining whether the index value of the to-be-decrypted ciphertext block and the index value of the second target ciphertext block meet a preset condition, to ascertain whether the data plaintext and the index value of the to-be-decrypted ciphertext block are valid data.

In the embodiment, whether the index value of the to-be-decrypted ciphertext block obtained in the step 304 and the index value of the second target ciphertext block obtained in the step 305 meet a preset condition may be determined, where the preset condition may be, e.g., a preset relational formula. The preset relational formula may be predefined, and consistent with the relational formula between adjacent ciphertext blocks when encrypting the data blocks.

If the index value of the to-be-decrypted ciphertext block and the index value of the second target ciphertext block meet the preset condition, then the data plaintext and the index value of the to-be-decrypted ciphertext block being valid data may be ascertained; otherwise, if the index value of the to-be-decrypted ciphertext block and the index value of the target ciphertext block fail to meet the preset condition, then the data plaintext and the index value of the to-be-decrypted ciphertext block being invalid data may be ascertained.

For example, when encrypting the data blocks, the index value of each data block equals the index value of a data block immediately prior to the each data block plus one, and then when ascertaining whether the data plaintext and the index value of the to-be-decrypted ciphertext block are valid, whether the index value of the to-be-decrypted ciphertext block equals the index value of the second target ciphertext block plus one may be ascertained. If the index value of the to-be-decrypted ciphertext block does not equal the index value of the second target ciphertext block plus one, then the data corresponding to the to-be-decrypted ciphertext block being falsified may be ascertained, and the decrypted data are not reliable. Thus, by ascertaining the relationship between index values, ascertaining the validity of decrypted data is implemented.

A method for decrypting data provided by the embodiment of the disclosure acquires a to-be-decrypted ciphertext block; then executes a first decryption on the to-be-decrypted ciphertext block using a preset security key to obtain a data plaintext and an index ciphertext of the to-be-decrypted ciphertext block; then executes a hash operation on the data plaintext of the to-be-decrypted ciphertext block to obtain an index key of the to-be-decrypted ciphertext block; then executes a second decryption on the index ciphertext of the to-be-decrypted ciphertext block using the index key of the to-be-decrypted ciphertext block to obtain an index value of the to-be-decrypted ciphertext block; then designates a ciphertext block immediately prior to the to-be-decrypted ciphertext block in a ciphertext block sequence as a second target ciphertext block, and decrypts the second target ciphertext block to acquire the index value of the second target ciphertext block; and finally determines whether the index value of the to-be-decrypted ciphertext block and the index value of the second target ciphertext block meet a preset condition, to ascertain whether the data plaintext and the index value of the to-be-decrypted ciphertext block are valid data, thereby improving the security of the index of data blocks, enabling to ascertain whether decrypted data are valid using a correlation between indexes, and effectively preventing data falsification.

Figure 4:
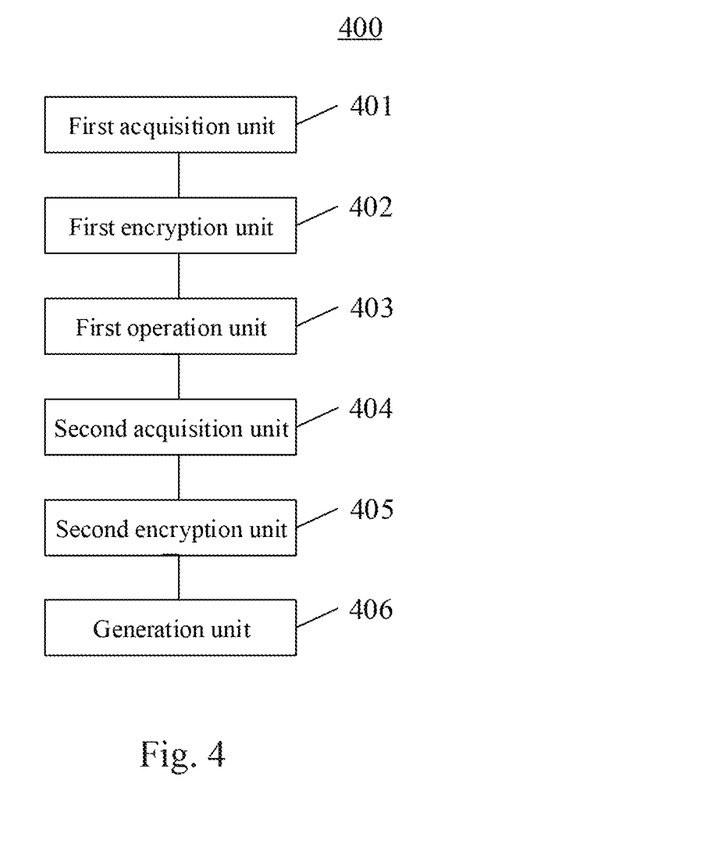
FIG. 4 is a schematic diagram of a structure of an embodiment of an apparatus for encrypting data according to the disclosure.

Further referring to FIG. 4, as an implementation of the method for encrypting data, the disclosure provides an embodiment of an apparatus for encrypting data.

As shown in FIG. 4, an apparatus 400 for encrypting data may include: a first acquisition unit 401, a first encryption unit 402, a first operation unit 403, a second acquisition unit 404, a second encryption unit 405, and a generation unit 406. The first acquisition unit 401 may be configured for acquiring a to-be-encrypted data block; the first encryption unit 402 may be configured for executing a first encryption on the to-be-encrypted data block using a preset security key to obtain a data ciphertext of the to-be-encrypted data block; the first operation unit 403 may be configured for executing a hash operation on the to-be-encrypted data block to obtain an index key of the to-be-encrypted data block; the second acquisition unit 404 may be configured for designating a last ciphertext block in a generated ciphertext block sequence as a first target ciphertext block, and decrypting the first target ciphertext block to acquire an index value of the first target ciphertext block; the second encryption unit 405 may be configured for executing a preset operation on the index value of the first target ciphertext block to obtain the index value of the to-be-encrypted data block, and executing a second encryption on the index value of the to-be-encrypted data block based on the index key to generate an index ciphertext of the to-be-encrypted data block; and the generation unit 406 may be configured for combining the data ciphertext and the index ciphertext of the to-be-encrypted data block to generate a ciphertext block corresponding to the to-be-encrypted data block.

In the embodiment, the first acquisition unit 401 may be connected to a device generating the to-be-encrypted data block through a wired or wireless connection, and acquire the to-be-encrypted data block from the device generating the to-be-encrypted data block. The first acquisition unit 401 may also collect data in real time, and divide the collected data into data blocks for use as to-be-encrypted data blocks.

The first encryption unit 402 may acquire a preset security key, and encrypt the to-be-encrypted data blocks acquired by the first acquisition unit 401 using a symmetric or asymmetric encryption algorithm to generate the data ciphertext of the to-be-encrypted data block. The preset security key may be a shared key, and each to-be-encrypted data block may be encrypted using the preset security key.

The first operation unit 403 may execute the hash operation on the to-be-encrypted data block to obtain the hash value for use as the index key of the to-be-encrypted data block.

The second acquisition unit 404 may acquire the last ciphertext block of the generated ciphertext block sequence, i.e., acquire the ciphertext block immediately prior to the to-be-encrypted data block, for use as the first target ciphertext block, and decrypt the first target ciphertext block to acquire the index value of the first target ciphertext block.

In some embodiments, the second acquisition unit 404 may be further configured for decrypting the first target ciphertext block using the preset security key, to obtain the index ciphertext and the data plaintext of the first target ciphertext block; executing the hash operation on the data plaintext of the first target ciphertext block to obtain the index key of the first target ciphertext block; and decrypting the index ciphertext of the first target ciphertext block using the index key of the first target ciphertext block, to obtain the index value of the first target ciphertext block.

The second encryption unit 405 may first execute a preset operation on the index value of the first target ciphertext block, such as an additive operation or a multiplication, and use the obtained value as the index value of the to-be-encrypted data block. Then the second encryption unit may execute a second encryption on the index value of the to-be-encrypted data block using the index key obtained through operation by the first operation unit 403, to obtain the index ciphertext of the to-be-encrypted data block.

In some embodiments, the second encryption unit 405 may be further configured for: increasing the index value of the first target ciphertext block by one to obtain the index value of the to-be-encrypted data block.

The generation unit 406 may splice the data ciphertext generated by the first encryption unit and the index ciphertext generated by the second encryption unit 405 to generate the ciphertext block corresponding to the to-be-encrypted data block.

In some embodiments, the apparatus for encrypting data may further include: an addition unit, configured for adding the ciphertext block corresponding to the to-be-encrypted data block to the end of the ciphertext block sequence.

It should be appreciated that the units recorded in the apparatus 400 correspond to the steps in the method described in FIG. 2. Therefore, the operations and characteristics described hereinbefore for the method are also applicable to the apparatus 400 and the units included therein, and are not repeated any more here.

The apparatus for encrypting data according to the embodiment of the disclosure can encrypt the index of the to-be-encrypted data block, thereby enhancing the index security. Furthermore, there is a correlation between indexes of adjacent data blocks, so that whether decrypted data are valid may be ascertained using the correlation between the indexes, ascertainable data validity has been achieved, and data falsification can be effectively prevented.

Figure 5:
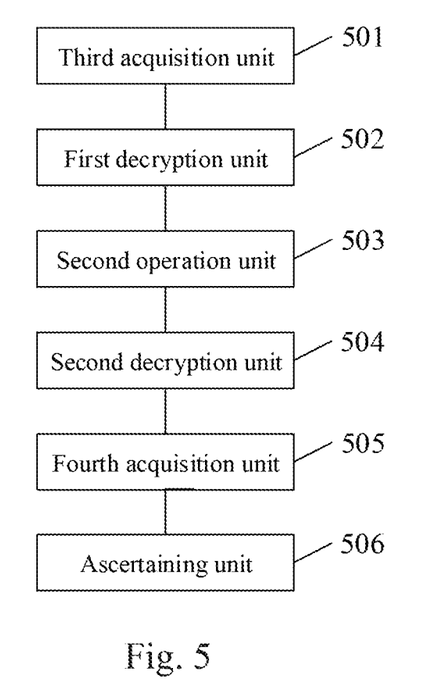
FIG. 5 is a schematic diagram of a structure of an embodiment of an apparatus for decrypting data according to the disclosure.

Further referring to FIG. 5, as an implementation of the method for decrypting data, the disclosure provides an embodiment of an apparatus for decrypting data.

As shown in FIG. 5, an apparatus 500 for decrypting data may include: a third acquisition unit 501, a first decryption unit 502, a second operation unit 503, a second decryption unit 504, a fourth acquisition unit 505, and an ascertaining unit 506. The third acquisition unit 501 may be configured for acquiring a to-be-decrypted ciphertext block; the first decryption unit 502 may be configured for executing a first decryption on the to-be-decrypted ciphertext block using a preset security key to obtain a data plaintext and an index ciphertext of the to-be-decrypted ciphertext block; the second operation unit 503 may be configured for executing a hash operation on the data plaintext of the to-be-decrypted ciphertext block to obtain an index key of the to-be-decrypted ciphertext block; the second decryption unit 504 may be configured for executing a second decryption on the index ciphertext of the to-be-decrypted ciphertext block using the index key of the to-be-decrypted ciphertext block to obtain an index value of the to-be-decrypted ciphertext block; the fourth acquisition unit 505 may be configured for designating a ciphertext block immediately prior to the to-be-decrypted ciphertext block in a ciphertext block sequence as a second target ciphertext block, and decrypting the second target ciphertext block to acquire the index value of the second target ciphertext block; and the ascertaining unit 506 may be configured for determining whether the index value of the to-be-decrypted ciphertext block and the index value of the second target ciphertext block meet a preset condition, to ascertain whether the data plaintext and the index value of the to-be-decrypted ciphertext block are valid data.

In the embodiment, the third acquisition unit 501 may acquire the to-be-decrypted ciphertext block containing the data ciphertext and the index ciphertext, and specifically may extract currently to-be-decrypted ciphertext blocks in order from a received ciphertext block sequence or a stored ciphertext block sequence.

The first decryption unit 502 may decrypt the to-be-decrypted ciphertext block acquired by the third acquisition unit 501 using a pre-acquired security key using an algorithm, such as DES or AES, to obtain the data plaintext and the index ciphertext of the to-be-decrypted ciphertext block.

The second operation unit 503 may execute a hash operation on the data plaintext decrypted by the first decryption unit 502, and use the obtained hash value as the index key of the to-be-decrypted ciphertext block.

The second decryption unit 504 may decrypt the index ciphertext obtained by the first decryption unit 502 using the index key obtained by the second operation unit 503 using a preset decryption algorithm, and convert the index ciphertext into a plaintext, i.e., the index value of the to-be-decrypted ciphertext block is obtained.

In the embodiment, it is necessary to ascertain the validity of decrypted data. The fourth acquisition unit 505 may acquire the ciphertext block immediately prior to the to-be-encrypted ciphertext block in the generated ciphertext block sequence for use as the second target ciphertext block, and decrypt the second target ciphertext block using the preset security key to acquire the index value of the second target ciphertext block.

In some embodiments, the fourth acquisition unit 505 may be further configured for obtaining the index value of the second target ciphertext block as follows: executing the first decryption on the second target ciphertext block using the preset security key to obtain the data plaintext and the index ciphertext of the second target ciphertext block; executing the hash operation on the data plaintext of the second target ciphertext block to obtain the index key of the second target ciphertext block; and executing the second decryption on the index ciphertext of the second target ciphertext block using the index key of the second target ciphertext block to obtain the index value of the second target ciphertext block.

The ascertaining unit 506 may be used for ascertaining whether the data plaintext and the index value of the to-be-decrypted data block are valid based on a determination result that whether the index value of the to-be-decrypted ciphertext block and the index value of the second target ciphertext block meet a preset condition.

In some embodiments, the ascertaining unit is further configured for: ascertaining, if the index value of the to-be-decrypted ciphertext block and the index value of the second target ciphertext block meet the preset condition, the data plaintext and the index value of the to-be-decrypted ciphertext block being valid data.

Furthermore, when the ascertaining unit determines the index value of the to-be-decrypted ciphertext block and the index value of the second target ciphertext block failing to meet the preset condition, the data plaintext and the index value of the to-be-decrypted ciphertext block being invalid data may be ascertained.

It should be appreciated that the units recorded in the apparatus 500 correspond to the steps in the method described in FIG. 3. Therefore, the operations and characteristics described hereinbefore for the method also apply to the apparatus 500 and the units included therein, and are not repeated any more here.

The apparatus 500 for decrypting data provided by the embodiment of the disclosure decrypts the to-be-decrypted ciphertext block to obtain the corresponding data plaintext and the index value, decrypts the ciphertext block immediately prior to the to-be-decrypted ciphertext block to obtain the corresponding index value, and ascertains whether the data are valid using the index value of the to-be-decrypted ciphertext block and the index value of the ciphertext block immediately prior to the to-be-decrypted ciphertext block, thereby ascertaining the validity of the decrypted data using the correlation between indexes of ciphertext blocks, and effectively preventing data falsification.

Figure 6:
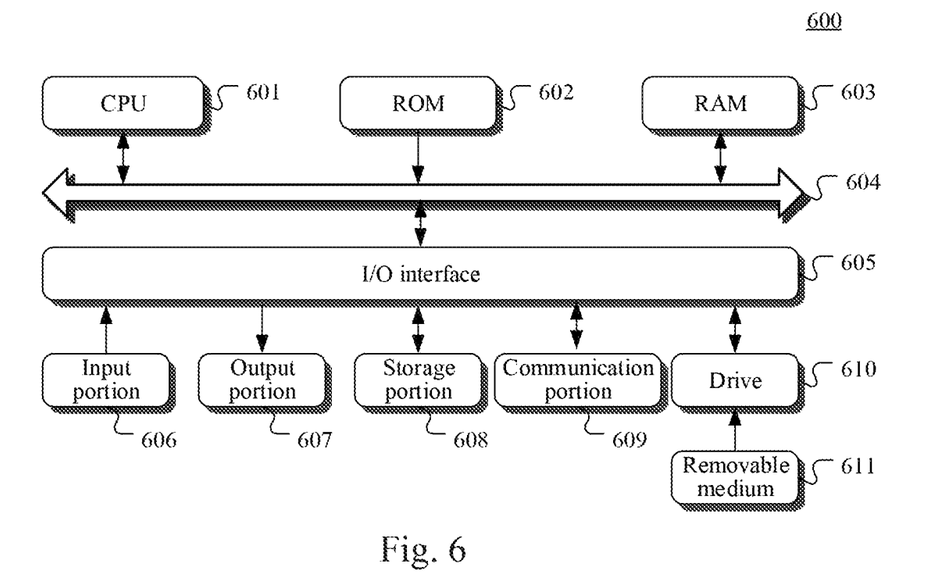
FIG. 6 is a schematic diagram of a system structure suitable for implementing a method for encrypting data or a device for decrypting data according to the disclosure.

Referring to FIG. 6, a schematic structural diagram of a computer system 600 adapted to implement a device (e.g., a terminal device or a server) of the embodiments of the present application is shown. The driving control device shown in FIG. 6 is merely an example and should not impose any restriction on the function and scope of use of the embodiments of the present application.

As shown in FIG. 6, the computer system 600 includes a central processing unit (CPU) 601, which may execute various appropriate actions and processes in accordance with a program stored in a read-only memory (ROM) 602 or a program loaded into a random access memory (RAM) 603 from a storage portion 608. The RAM 603 also stores various programs and data required by operations of the system 600. The CPU 601, the ROM 602 and the RAM 603 are connected to each other through a bus 604. An input/output (I/O) interface 605 is also connected to the bus 604.

The following components are connected to the I/O interface 605: an input portion 606 including a keyboard, a mouse etc.; an output portion 607 comprising a cathode ray tube (CRT), a liquid crystal display device (LCD), a speaker etc.; a storage portion 608 including a hard disk and the like; and a communication portion 609 comprising a network interface card, such as a LAN card and a modem. The communication portion 609 performs communication processes via a network, such as the Internet. A drive 610 is also connected to the I/O interface 605 as required. A removable medium 611, such as a magnetic disk, an optical disk, a magneto-optical disk, and a semiconductor memory, may be installed on the drive 610, to facilitate the retrieval of a computer program from the removable medium 611, and the installation thereof on the storage portion 608 as needed.

In particular, according to embodiments of the present disclosure, the process described above with reference to the flow chart may be implemented in a computer software program. For example, an embodiment of the present disclosure includes a computer program product, which comprises a computer program that is tangibly embedded in a machine-readable medium. The computer program comprises program codes for executing the method as illustrated in the flow chart. In such an embodiment, the computer program may be downloaded and installed from a network via the communication portion 609, and/or may be installed from the removable media 611. The computer program, when executed by the central processing unit (CPU) 601, implements the above mentioned functionalities as defined by the methods of the present disclosure. It should be noted that the computer readable medium in the present disclosure may be computer readable storage medium. An example of the computer readable storage medium may include, but not limited to: semiconductor systems, apparatus, elements, or a combination any of the above. A more specific example of the computer readable storage medium may include but is not limited to: electrical connection with one or more wire, a portable computer disk, a hard disk, a random access memory (RAM), a read only memory (ROM), an erasable programmable read only memory (EPROM or flash memory), a fibre, a portable compact disk read only memory (CD-ROM), an optical memory, a magnet memory or any suitable combination of the above. In the present disclosure, the computer readable storage medium may be any physical medium containing or storing programs which can be used by a command execution system, apparatus or element or incorporated thereto. The computer readable medium may be any computer readable medium except for the computer readable storage medium. The computer readable medium is capable of transmitting, propagating or transferring programs for use by, or used in combination with, a command execution system, apparatus or element. The program codes contained on the computer readable medium may be transmitted with any suitable medium including but not limited to: wireless, wired, optical cable, RF medium etc., or any suitable combination of the above.

The flow charts and block diagrams in the accompanying drawings illustrate architectures, functions and operations that may be implemented according to the systems, methods and computer program products of the various embodiments of the present disclosure. In this regard, each of the blocks in the flow charts or block diagrams may represent a module, a program segment, or a code portion, said module, program segment, or code portion comprising one or more executable instructions for implementing specified logic functions. It should also be noted that, in some alternative implementations, the functions denoted by the blocks may occur in a sequence different from the sequences shown in the figures. For example, any two blocks presented in succession may be executed, substantially in parallel, or they may sometimes be in a reverse sequence, depending on the function involved. It should also be noted that each block in the block diagrams and/or flow charts as well as a combination of blocks may be implemented using a dedicated hardware-based system executing specified functions or operations, or by a combination of a dedicated hardware and computer instructions.

The units or modules involved in the embodiments of the present application may be implemented by means of software or hardware. The described units or modules may also be provided in a processor, for example, described as: a processor, comprising a first acquisition unit, a first encryption unit, a first operation unit, a second acquisition unit, a second encryption unit, and a generation unit, where the names of these units or modules do not in some cases constitute a limitation to such units or modules themselves. For example, the first acquisition unit may also be described as "a unit for acquiring a to-be-encrypted data block."

In another aspect, the present application further provides a non-transitory computer-readable storage medium. The non-transitory computer-readable storage medium may be the non-transitory computer-readable storage medium included in the apparatus in the above described embodiments, or a stand-alone non-transitory computer-readable storage medium not assembled into the apparatus. The non-transitory computer-readable storage medium stores one or more programs. The one or more programs, when executed by a device, cause the device to: acquire a to-be-encrypted data block; execute a first encryption on the to-be-encrypted data block using a preset security key to obtain a data ciphertext of the to-be-encrypted data block; execute a hash operation on the to-be-encrypted data block to obtain an index key of the to-be-encrypted data block; designate a last ciphertext block in a generated ciphertext block sequence as a first target ciphertext block, and decrypt the first target ciphertext block to acquire an index value of the first target ciphertext block; execute a preset operation on the index value of the first target ciphertext block to obtain the index value of the to-be-encrypted data block, and execute a second encryption on the index value of the to-be-encrypted data block based on the index key to generate an index ciphertext of the to-be-encrypted data block; and combine the data ciphertext and the index ciphertext of the to-be-encrypted data block to generate a ciphertext block corresponding to the to-be-encrypted data block.

In another aspect, the present application further provides a non-transitory computer-readable storage medium. The non-transitory computer-readable storage medium may be the non-transitory computer-readable storage medium included in the apparatus in the above described embodiments, or a stand-alone non-transitory computer-readable storage medium not assembled into the apparatus. The non-transitory computer-readable storage medium stores one or more programs. The one or more programs, when executed by a device, cause the device to: acquire a to-be-decrypted ciphertext block; execute a first decryption on the to-be-decrypted ciphertext block using a preset security key to obtain a data plaintext and an index ciphertext of the to-be-decrypted ciphertext block; execute a hash operation on the data plaintext of the to-be-decrypted ciphertext block to obtain an index key of the to-be-decrypted ciphertext block; execute a second decryption on the index ciphertext of the to-be-decrypted ciphertext block using the index key of the to-be-decrypted ciphertext block to obtain an index value of the to-be-decrypted ciphertext block; designate a ciphertext block immediately prior to the to-be-decrypted ciphertext block in a ciphertext block sequence as a second target ciphertext block, and decrypt the second target ciphertext block to acquire the index value of the second target ciphertext block; and determine whether the index value of the to-be-decrypted ciphertext block and the index value of the second target ciphertext block meet a preset condition, to ascertain whether the data plaintext and the index value of the to-be-decrypted ciphertext block are valid data.

The above description only provides an explanation of the preferred embodiments of the present application and the technical principles used. It should be appreciated by those skilled in the art that the inventive scope of the present application is not limited to the technical solutions formed by the particular combinations of the above-described technical features. The inventive scope should also cover other technical solutions formed by any combinations of the above-described technical features or equivalent features thereof without departing from the concept of the disclosure. Technical schemes formed by the above-described features being interchanged with, but not limited to, technical features with similar functions disclosed in the present application are examples.

What is claimed is:
1. A method for decrypting data, comprising:
   acquiring a to-be-decrypted ciphertext block;
   executing a first decryption on the to-be-decrypted ciphertext block using a preset security key to obtain a data plaintext and an index ciphertext of the to-be-decrypted ciphertext block;

executing a hash operation on the data plaintext of the to-be-decrypted ciphertext block to obtain an index key of the to-be-decrypted ciphertext block;

executing a second decryption on the index ciphertext of the to-be-decrypted ciphertext block using the index key of the to-be-decrypted ciphertext block to obtain an index value of the to-be-decrypted ciphertext block;

designating a ciphertext block immediately prior to the to-be-decrypted ciphertext block in a ciphertext block sequence as a second target ciphertext block, and decrypting the second target ciphertext block to acquire the index value of the second target ciphertext block; and determining whether the index value of the to-be-decrypted ciphertext block and the index value of the second target ciphertext block meet a preset condition, to ascertain whether the data plaintext and the index value of the to-be-decrypted ciphertext block are valid data.

2. The method according to claim 1, wherein the designating a ciphertext block immediately prior to the to-be-decrypted ciphertext block in a ciphertext block sequence as a second target ciphertext block, and decrypting the second target ciphertext block to acquire the index value of the second target ciphertext block comprises:

executing the first decryption on the second target ciphertext block using the preset security key to obtain the data plaintext and the index ciphertext of the second target ciphertext block;

executing the hash operation on the data plaintext of the second target ciphertext block to obtain the index key of the second target ciphertext block; and executing the second decryption on the index ciphertext of the second target ciphertext block using the index key of the second target ciphertext block to obtain the index value of the second target ciphertext block.

3. The method according to claim 1, wherein the determining whether the index value of the to-be-decrypted ciphertext block and the index value of the second target ciphertext block meet a preset condition, to ascertain whether the data plaintext and the index value of the to-be-decrypted ciphertext block are valid data comprises:

ascertaining, if the index value of the to-be-decrypted ciphertext block and the index value of the second target ciphertext block meet the preset condition, the data plaintext and the index value of the to-be-decrypted ciphertext block being valid data.

4. An apparatus for decrypting data, comprising:
at least one processor; and
a memory storing instructions, the instructions when executed by the at least one processor, cause the at least one processor to perform operations, the operations comprising:

acquiring a to-be-decrypted ciphertext block;

executing a first decryption on the to-be-decrypted ciphertext block using a preset security key to obtain a data plaintext and an index ciphertext of the to-be-decrypted ciphertext block;

executing a hash operation on the data plaintext of the to-be-decrypted ciphertext block to obtain an index key of the to-be-decrypted ciphertext block;

executing a second decryption on the index ciphertext of the to-be-decrypted ciphertext block using the index key of the to-be-decrypted ciphertext block to obtain an index value of the to-be-decrypted ciphertext block;

designating a ciphertext block immediately prior to the to-be-decrypted ciphertext block in a ciphertext block sequence as a second target ciphertext block, and decrypting the second target ciphertext block to acquire the index value of the second target ciphertext block; and determining whether the index value of the to-be-decrypted ciphertext block and the index value of the second target ciphertext block meet a preset condition, to ascertain whether the data plaintext and the index value of the to-be-decrypted ciphertext block are valid data.

5. The apparatus according to claim 4, wherein the designating a ciphertext block immediately prior to the to-be-decrypted ciphertext block in a ciphertext block sequence as a second target ciphertext block, and decrypting the second target ciphertext block to acquire the index value of the second target ciphertext block comprises:

executing the first decryption on the second target ciphertext block using the preset security key to obtain the data plaintext and the index ciphertext of the second target ciphertext block;

executing the hash operation on the data plaintext of the second target ciphertext block to obtain the index key of the second target ciphertext block; and executing the second decryption on the index ciphertext of the second target ciphertext block using the index key of the second target ciphertext block to obtain the index value of the second target ciphertext block.

6. The apparatus according to claim 4, wherein the determining whether the index value of the to-be-decrypted ciphertext block and the index value of the second target ciphertext block meet a preset condition, to ascertain whether the data plaintext and the index value of the to-be-decrypted ciphertext block are valid data comprises:

ascertaining, if the index value of the to-be-decrypted ciphertext block and the index value of the second target ciphertext block meet the preset condition, the data plaintext and the index value of the to-be-decrypted ciphertext block being valid data.

7. A non-transitory computer-readable storage medium storing a computer program, wherein the computer program when executed by one or more processors, causes the one or more processors to perform operations, the operations comprising:

acquiring a to-be-decrypted ciphertext block;

executing a first decryption on the to-be-decrypted ciphertext block using a preset security key to obtain a data plaintext and an index ciphertext of the to-be-decrypted ciphertext block;

executing a hash operation on the data plaintext of the to-be-decrypted ciphertext block to obtain an index key of the to-be-decrypted ciphertext block;

executing a second decryption on the index ciphertext of the to-be-decrypted ciphertext block using the index key of the to-be-decrypted ciphertext block to obtain an index value of the to-be-decrypted ciphertext block;

designating a ciphertext block immediately prior to the to-be-decrypted ciphertext block in a ciphertext block sequence as a second target ciphertext block, and decrypting the second target ciphertext block to acquire the index value of the second target ciphertext block; and determining whether the index value of the to-be-decrypted ciphertext block and the index value of the second target ciphertext block meet a preset condition, to ascertain whether the data plaintext and the index value of the to-be-decrypted ciphertext block are valid data.

8. The non-transitory computer-readable storage medium according to claim 7, wherein the designating a ciphertext block immediately prior to the to-be-decrypted ciphertext block in a ciphertext block sequence as a second target ciphertext block, and decrypting the second target ciphertext block to acquire the index value of the second target ciphertext block comprises:
- executing the first decryption on the second target ciphertext block using the preset security key to obtain the data plaintext and the index ciphertext of the second target ciphertext block;
- executing the hash operation on the data plaintext of the second target ciphertext block to obtain the index key of the second target ciphertext block; and
- executing the second decryption on the index ciphertext of the second target ciphertext block using the index key of the second target ciphertext block to obtain the index value of the second target ciphertext block.

9. The non-transitory computer-readable storage medium according to claim 7, wherein the determining whether the index value of the to-be-decrypted ciphertext block and the index value of the second target ciphertext block meet a preset condition, to ascertain whether the data plaintext and the index value of the to-be-decrypted ciphertext block are valid data comprises:
- ascertaining, if the index value of the to-be-decrypted ciphertext block and the index value of the second target ciphertext block meet the preset condition, the data plaintext and the index value of the to-be-decrypted ciphertext block being valid data.

* * * * *